United States Patent [19]

Otsuka et al.

[11] Patent Number: 5,311,580
[45] Date of Patent: May 10, 1994

[54] COMMUNICATION APPARATUS FOR PROVIDING A MODULATED ANALOG WAVE

[75] Inventors: Kuniaki Otsuka, Yokohama; Isamu Ozawa, Hachioji, both of Japan

[73] Assignee: Canon Kabushiki Kaisha, Tokyo, Japan

[21] Appl. No.: 8,845

[22] Filed: Jan. 25, 1993

Related U.S. Application Data

[63] Continuation of Ser. No. 799,026, Nov. 25, 1991, abandoned, which is a continuation of Ser. No. 372,830, Jun. 29, 1989, abandoned.

[30] Foreign Application Priority Data

Jul. 18, 1988 [JP] Japan .................. 63-180026
Apr. 4, 1989 [JP] Japan .................... 1-086310

[51] Int. Cl.⁵ .................................... H04M 11/00
[52] U.S. Cl. .................... 379/100; 379/114; 379/116; 379/119; 379/135; 375/67
[58] Field of Search ............. 379/100, 96, 97, 98, 379/93, 144, 114, 115, 361, 116, 119, 135; 375/67

[56] References Cited

U.S. PATENT DOCUMENTS

| | | | |
|---|---|---|---|
| 4,061,886 | 12/1977 | Callahan, Jr. et al. | 379/361 |
| 4,090,034 | 5/1978 | Moylan | 379/115 |
| 4,110,567 | 8/1978 | Boucher | 379/361 |
| 4,132,871 | 1/1979 | Lake | 379/361 |
| 4,349,704 | 9/1982 | Gillis | 379/361 |
| 4,843,613 | 6/1989 | Crowle | 375/67 |
| 4,871,987 | 10/1989 | Kawase | 375/67 |
| 4,887,164 | 12/1989 | Takahashi | 379/100 |
| 4,891,836 | 1/1990 | Takahashi | 379/100 |
| 4,897,870 | 1/1990 | Golden | 379/144 |
| 4,916,607 | 4/1990 | Teraichi et al. | 379/98 |
| 4,918,722 | 4/1990 | Duehren et al. | 379/100 |
| 4,974,254 | 11/1990 | Perine et al. | 379/100 |
| 5,007,084 | 4/1991 | Materna et al. | 379/93 |
| 5,068,888 | 11/1991 | Scherk et al. | 379/100 |

*Primary Examiner*—Curtis Knutz
*Assistant Examiner*—Stella L. Woo
*Attorney, Agent, or Firm*—Fitzpatrick, Cella, Harper & Scinto

[57] ABSTRACT

A communication apparatus generates plural data representing a modulated analog wave by sequentially reading plural data representing an analog wave from a memory storing plural data, and controlling a sequence of such plural data to be read in accordance with information to be transmitted. Such a configuration is also provided in a switchboard to transmit internal information of the switchboard.

49 Claims, 13 Drawing Sheets

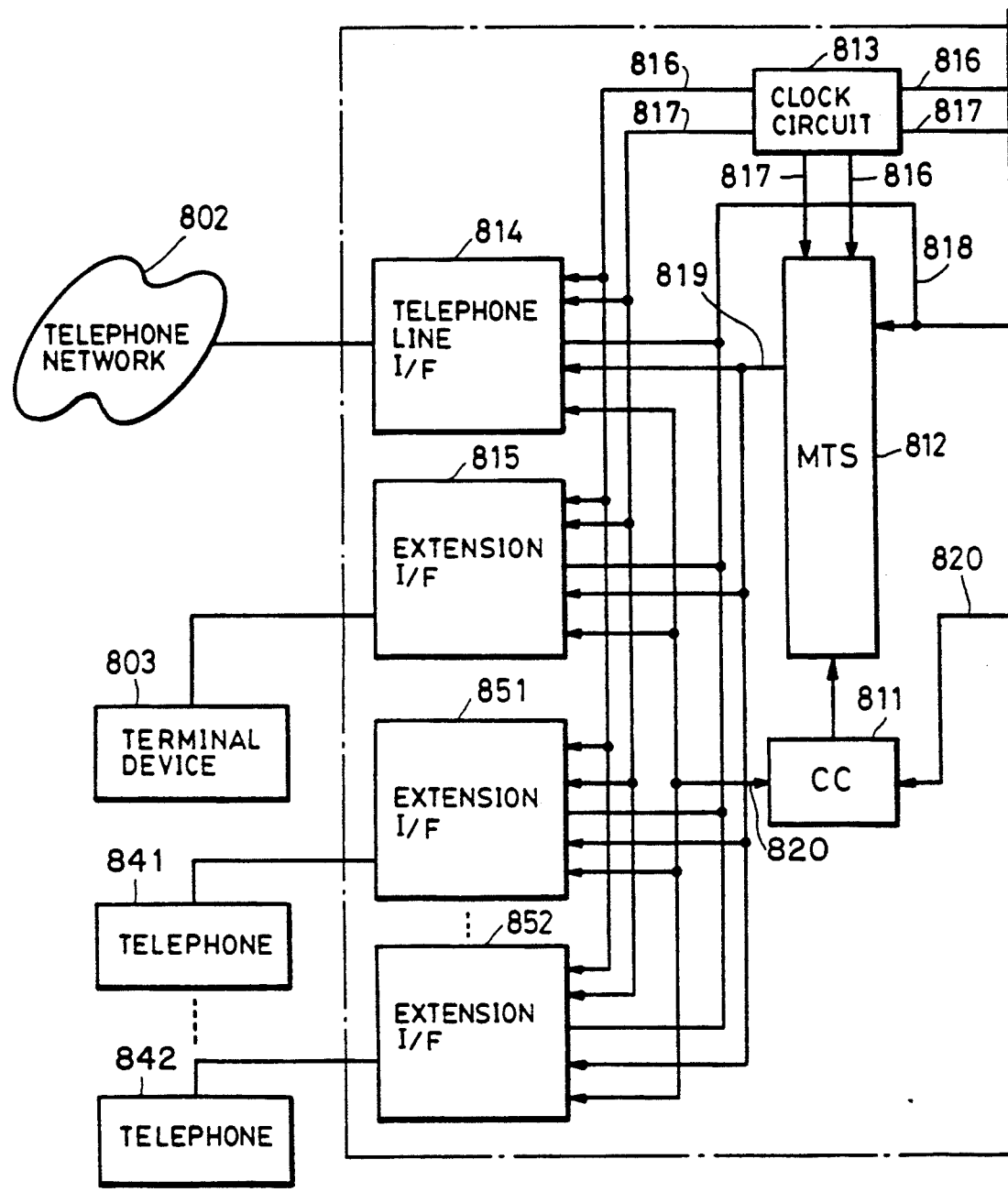

| FIG. 7A | FIG. 7B |

TABLE 321

| ADDRESS | PCM CODE (CONTENT OF MEMORY) |
|---------|------------------------------|
| 0       | $P_0$                        |
| 1       | $P_1$                        |
| 2       | $P_2$                        |
| ⋮       | ⋮                            |
| 39      | $P_{39}$                     |

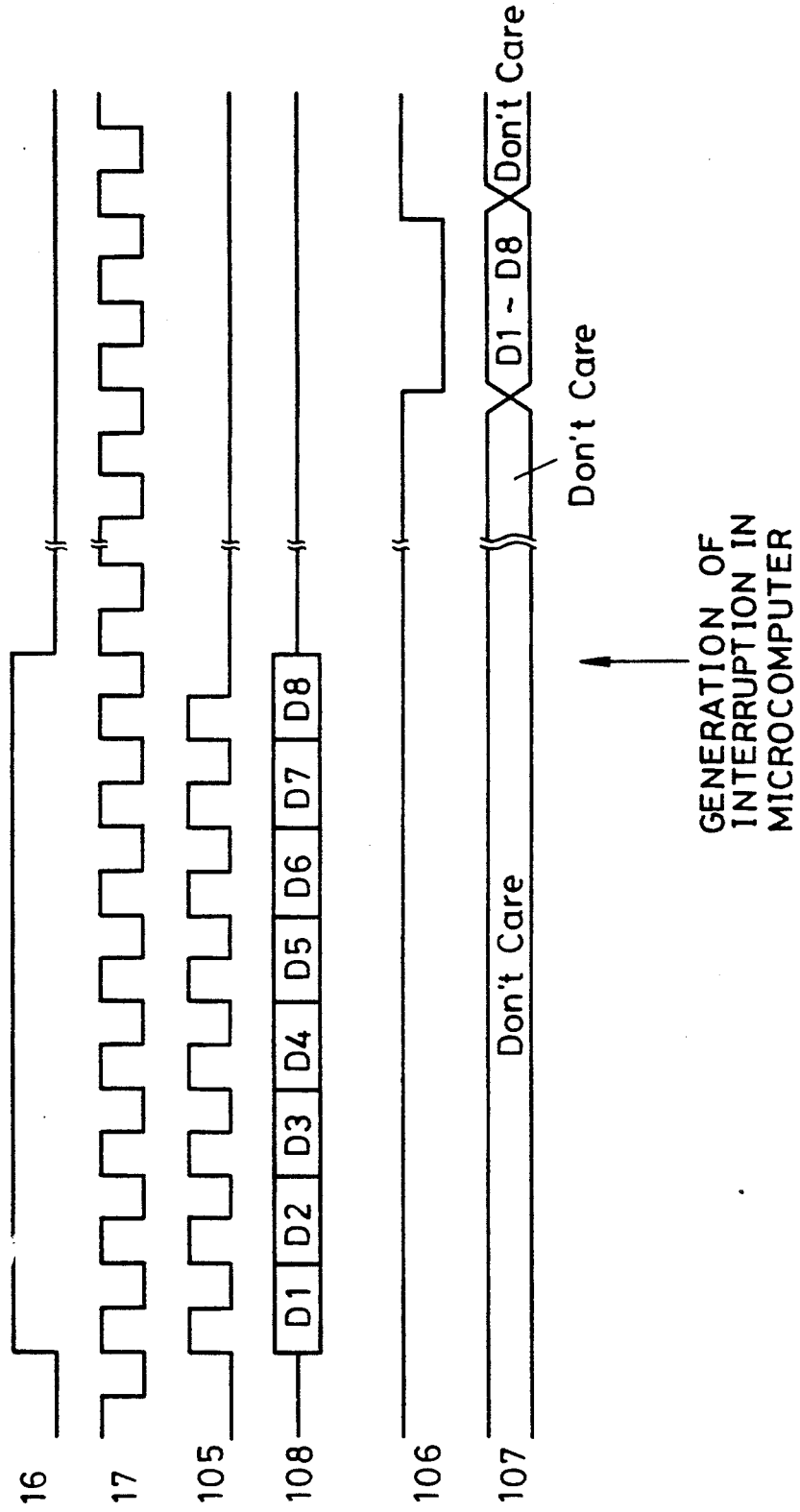

COMMUNICATION APPARATUS FOR PROVIDING A MODULATED ANALOG WAVE

This application is a continuation of application Ser. No. 07/799,026 filed Nov. 25, 1991, now abandoned, which is a continuation application of Ser. No. 07/372,830 filed Jun. 29, 1989, abandoned.

BACKGROUND OF THE INVENTION

1. Field of the Invention

This invention relates to a communication apparatus for transmitting information by modulating carrier waves.

2. Description of the Related Art

FIG. 1 shows a configurational diagram of a conventional telephone exchange system. In FIG. 1, there are shown a main unit 201', telephone lines 202a' and 202b', extension telephones 203, 204 and 205, a fascimile device (FAX) 207', a conversation fee administrating unit 209' and an interface 210, such as RS232C, Centronix and the like. In this configuration, conversation fees used by the system are summed up in the main unit 201', and output to the conversation fee administrating unit 209'.

In the above-described conventional example, however, the conversation fee administrating unit 209' is always required and is dedicated apparatus.

Furthermore, in the prior art, when data are transmitted by digital modulation to a facsimile, a printer, a personal computer and the like, a modem including a digital signal processsor (DSP) is needed. The DSP is a circuit for outputting carrier waves subjected to digital modulation in accordance with input digital data, and is a very expensive apparatus.

SUMMARY OF THE INVENTION

It is an object of the present invention to improve a communication apparatus taking into consideration the above-described problems.

It is a further object of the present invention to provide a communication apparatus for transmitting information by controlling a sequence of generating digital data.

It is a still further object of the present invention to improve a configuration for transmitting digital data.

It is still another object of the present invention to provide a communication apparatus for transmitting information by controlling the reading of digital data from a memory.

It is still a further object of the present invention to provide a switchboard for transmitting data to a data communication apparatus by controlling generation of digital data.

It is still another object of the present invention to provide a communication system for summing up conversation fees and transmitting the result to a facsimile.

These and other objects of the present invention will become more apparent from the following detailed description of the preferred embodiments.

BRIEF DESCRIPTION OF THE DRAWINGS

FIG. 10 is a timing chart of the P/S conversion circuit 35;

Figure 12:
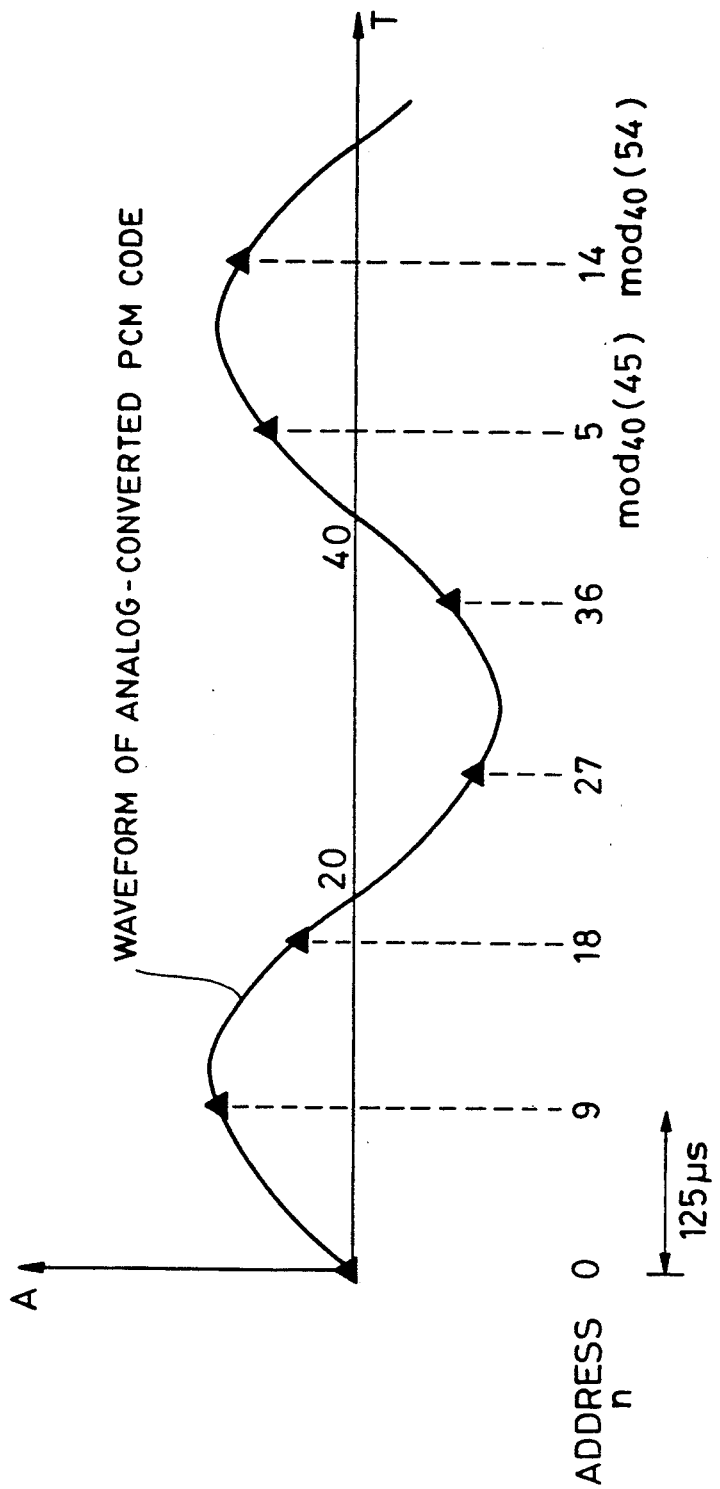
Figure 13:
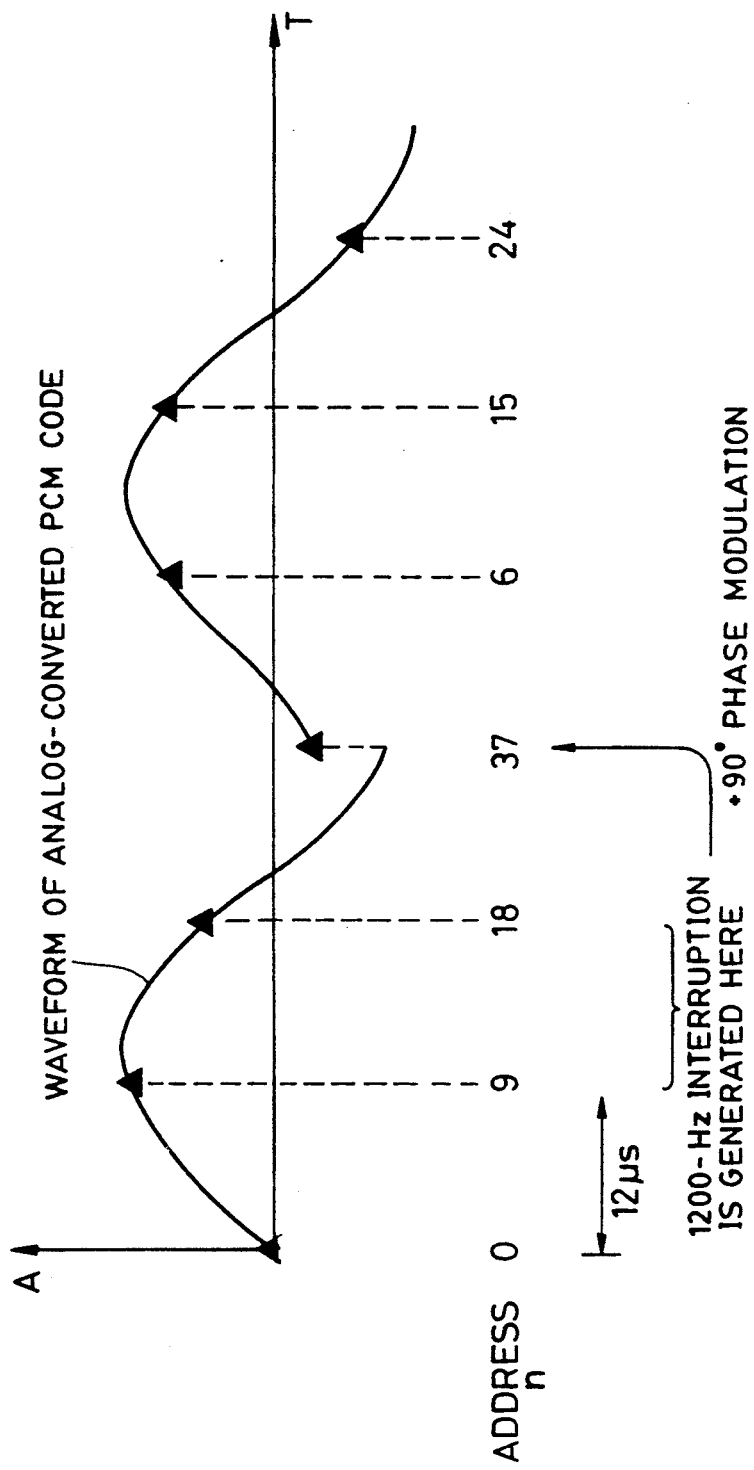

FIG, 11 is a flow chart of interruption processing;

FIG. 12 is a diagram showing a relationship between a carrier wave and address n; and FIG. 13 is a diagram showing a relationship between a carrier wave and address n during phase modulation.

DETAILED DESCRIPTION OF THE PREFERRED EMBODIMENTS

Example 1

Figure 1:
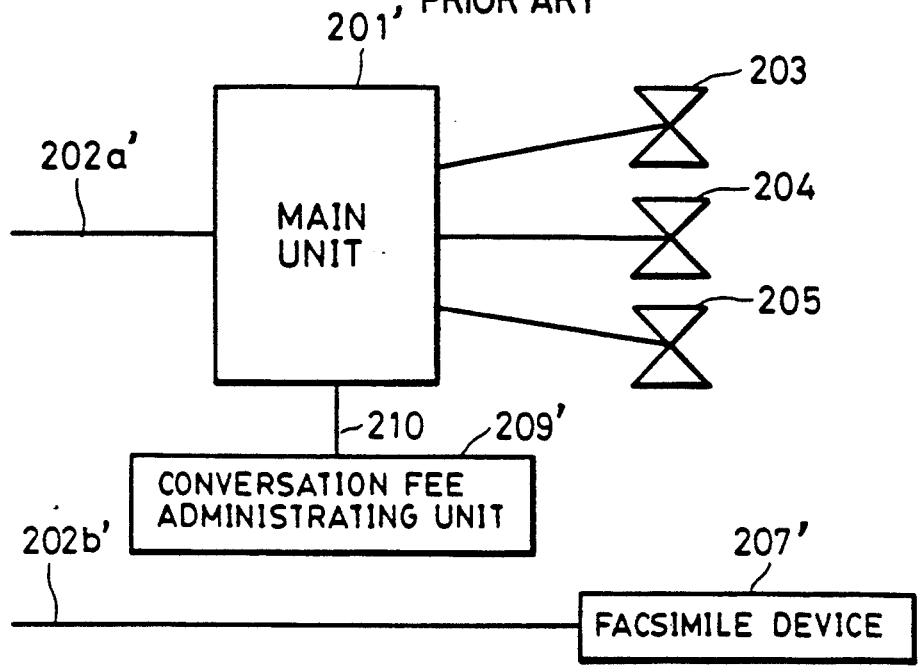
FIG. 1 is a block diagram of a conventional telephone exchange system.
Figure 2:
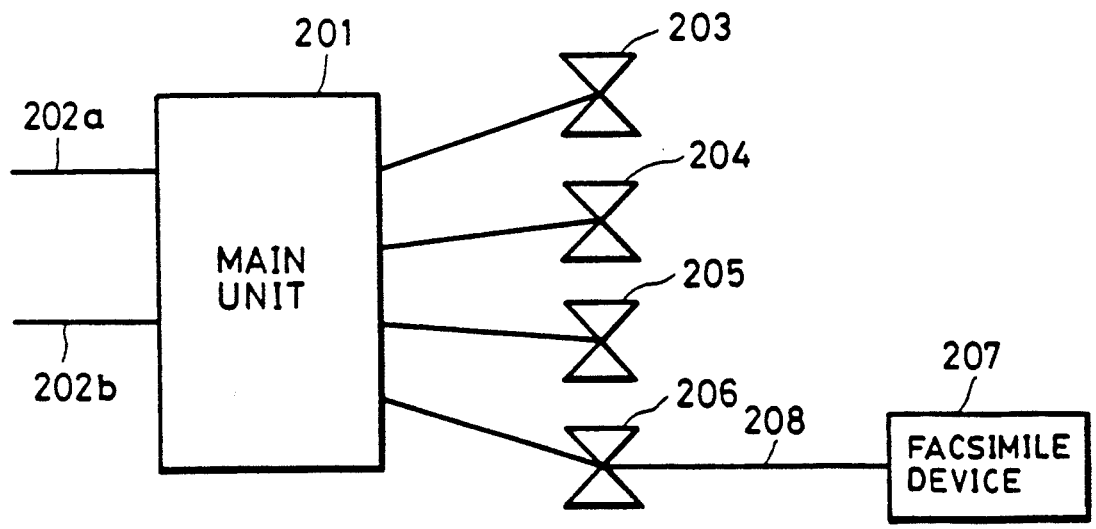
FIG. 2 is a block diagram of a telephone exchange system of a first embodimemt of the present invention.

FIG. 2 shows a configurational diagram of a telephone exchange system of a first embodiment of the present invention. In FIG. 2, there are shown a main unit 201, telephone lines 202a, 202b, a telephone set 206 provided with functions for housing a FAX 207 in its extension, and a circuit 208 for connecting the telephone set 206 provided with functions to the FAX 207. Like components as those in the conventional example shown in FIG. 1 are indicated by like numerals, and an explanation thereof will be omitted.

The extension telephone sets 203 through 205 and the extension telephone set 206 are connected to the main unit 201 via respective independent circuits. When the main unit 201 detects a call-reception from one of the telephone lines 202a, 202b, it rings the extension telephone sets 203 through 205 and the extension telephone set 206 provided with functions. The main unit 201 then connects a telephone set which has responded to the ringing with the telephone line. During the connection, a vacant telephone set can perform a calling via a vacant telephone line 202a or 202b, or two incoming calls may be received.

Figure 3:
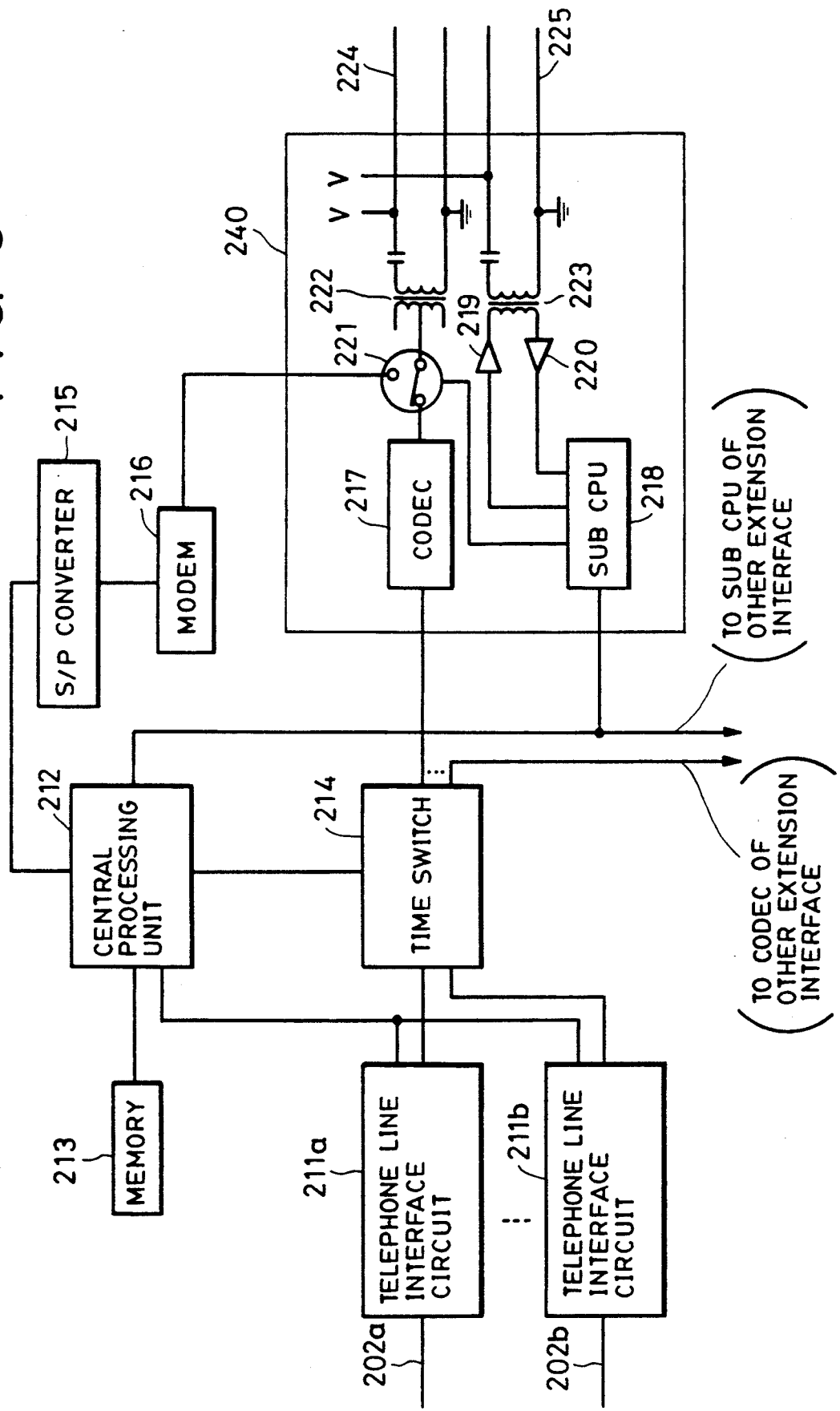
FIG. 3 is a block diagram of a main unit of the first embodiment.

FIG. 3 is a block diagram of a portion of the main unit 201 in FIG. 2, and drawn especially centering around the portion connected to the telephone set 206 provided with functions.

In FIG. 3, there are shown telephone lines 202a, 202b, telephone line interface circuits 211a, 211b, a central processing unit 212, a memory 213, a time switch 214, a serial-parallel conversion circuit 215, a modulator-demodulator (MODEM) 216, a coder-decoder (CO-DEC) 217, a sub central processing unit (sub CPU) 218 for exchanging signals with the extension telephone set 206, a driver 219, a receiver 220, a changeover switch 221, a two-line-four-line converter 222, a transformer 223, a conversation line 224 and a control line 225. The main unit 201 and the extension telephone set 206 provided with functions are connected to each other by the conversation line 224 and the control line 225. A current required for conversation is supplied to the conversation line 224, and a current other than the conversation current to the extension telephone set 206 is supplied to the control line 225. A block indicated by the numeral 240 constitutes an extension interface. A corresponding extension interface is provided for each of the telephone sets 203-205.

When the central prossing unit 212 detects a call-reception from the telephone line 202a, 202b via the telephone line interface 211a, 211b, respectively, it rings telephone sets 203-206 via the sub CPU 218 of each extension interface. When the central processing unit 212 then detects a response of a telephone set via the sub CPU 218 of its extension interface, it connects the call-received telephone line and the responded telephone set by controlling the time switch 214.

Figure 4:
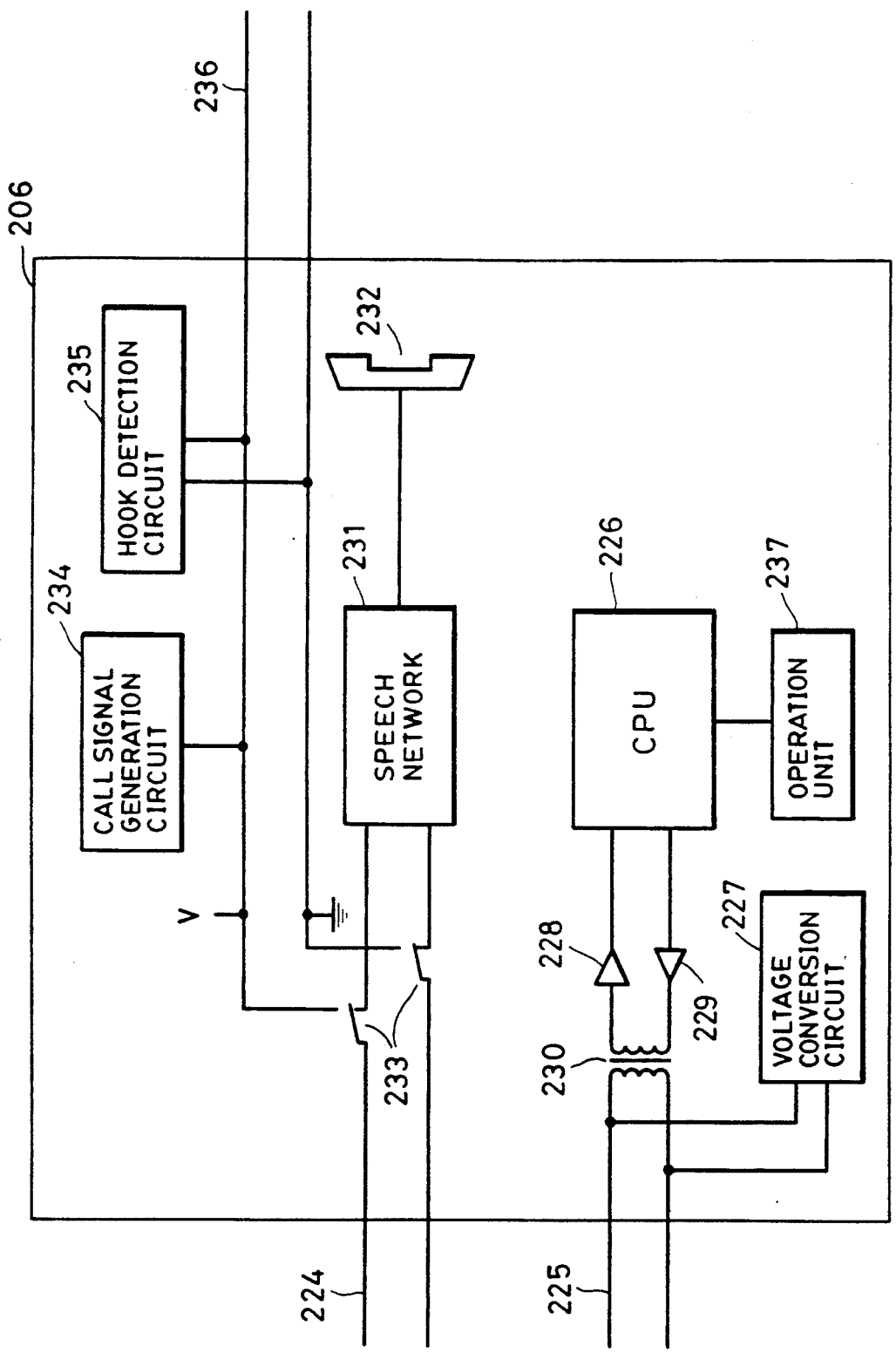
FIG. 4 is a block diagram of a telephone set provided with functions of the first embodiment.

FIG. 4 is a block diagram of the extension telephone set 206 provided with functions. In FIG. 4, there are shown the conversation line 224, the control line 225, a central processing unit (CPU) 226, and a voltage conversion circuit 227 which converts a voltage V supplied from the main unit 201 into a necessary voltage. There are also shown a receiver 228, a driver 229, a transformer 230, a speech network 231, a handset 232, a relay 233, a call-signal generation circuit 234, a hook detection circuit 235, a circuit 236 connected to the FAX 207, and an operation unit 237.

The relay 233 connects the conversation line 224 to the speech network 231 or the FAX line 236 by an instruction of the CPU 226. The call-signal generation circuit 235 transmits a call signal to the FAX 207 via the FAX line 236 by an instruction of the CPU 226. The hook detection circuit 235 detects whether the handset 232 is hooked on and the response of the FAX 207 and transmits the detected result to the CPU 226. The CPU 226 sends information to the sub CPU 218 of the main unit 201 via the driver 229, the transformer 230, the control line 225, the transformer 223 and the receiver 220. On the other hand, the sub CPU 218 of the main unit 201 sends instructions to the CPU 226 via the driver 219, the transformer 223, the control line 225, the transformer 230 and the receiver 228.

The changeover switch 221 in FIG. 3 and the relay 233 are illustrated in FIG. 4 as being set to positions for performing a conversation.

Figure 5:
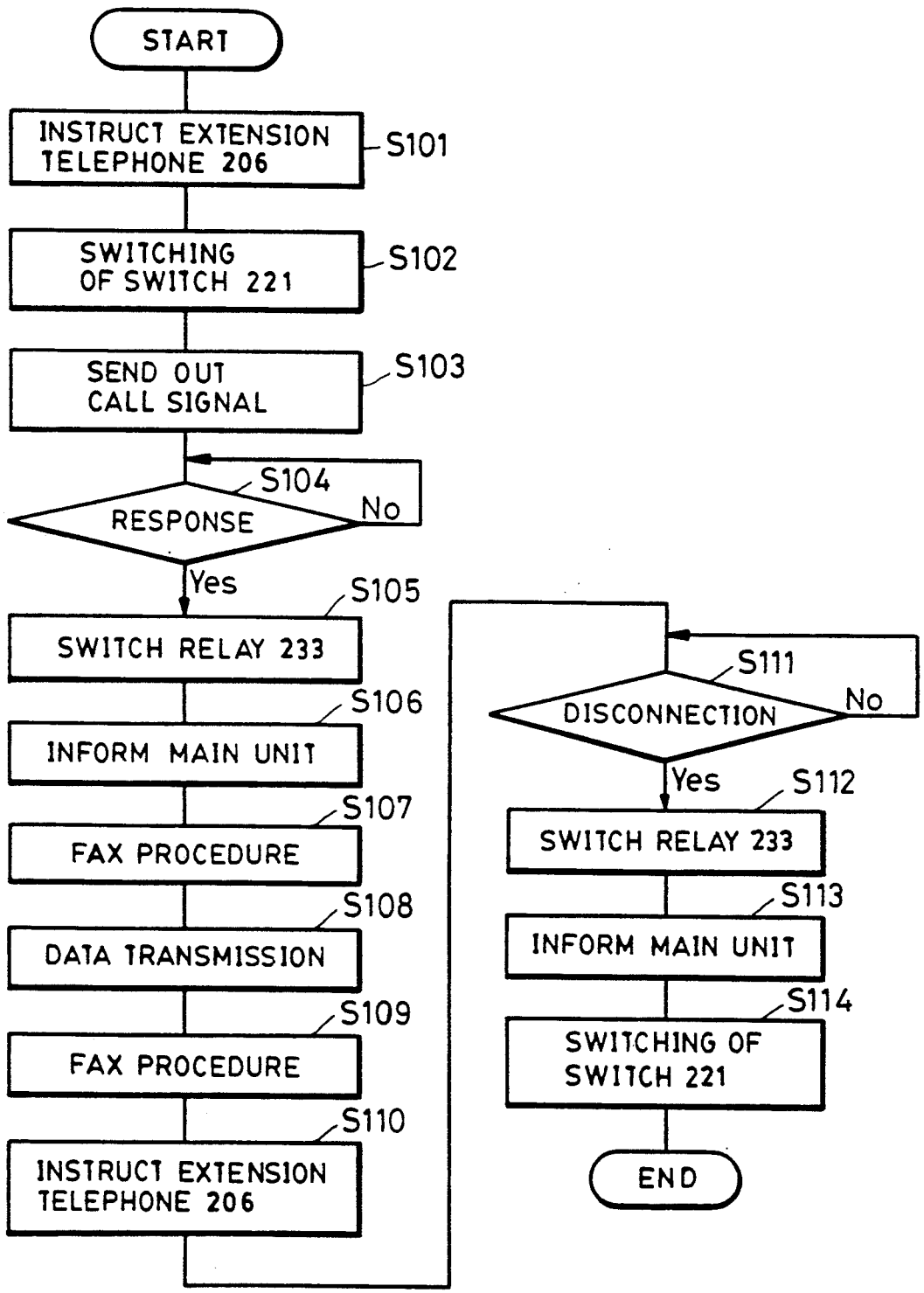
FIG. 5 is a flow chart of an operation of the first embodiment.

A procedure for transmitting conversation fee data to the FAX 207 is shown in FIG. 5.

The central processing unit 212 within the main unit 201 first issues an instruction to call the FAX 207 in the CPU 226 of the extension telephone set 206 provided with functions via the sub CPU 218 (step S101). The sub CPU 218 performs communication of control signals with the CPU 226 of the extension telephone set 206 provided with functions via the control line 225. The central processing unit 212 switches the switch 221 to the side for connecting the MODEM 216 to the two-line-four-line converter 222 (step S102). The CPU 226 of the extension telephone set 206 instructed to call the FAX 207 connects the call-signal generation circuit 234 to the FAX line 236, and sends out a call signal to the FAX 207 (step S103). When a response by the FAX 207 is detected by the hook detection circuit 235 (step S104), the CPU 226 switches the relay 233 to connect the conversation line 224 to the FAX line 236 (step S105). The CPU 226 then notifies the sub CPU 218 within the main unit 201 of the completion of calling of the FAX 207 via the control line 225 (step S106).

When the notification is received from the sub CPU 218, the central processing unit 212 starts a well-known FAX procedure for connection (step S107).

The central processing unit 212 reads conversation-fee data stored in the memory 213, and transmits the conversation-fee data after converting them into facsimile codes (step S108). When the transmission has been completed, the central processing unit 212 performs a well-known FAX procedure for disconnection (step S109), and notifies the extension telephone set 206 of the completion of FAX transmission through the control line 225 via the sub CPU 218 (step S110).

When the FAX procedure for disconnection has been performed, the FAX 207 disconnects the circuit.

When the disconnection of the FAX 207 has been detected by the hook detection circuit 235 (step S111), the CPU 226 of the extension telephone set 206 returns the relay 233 to the original position and connects the conversation line 224 to the speech network 231 (step S112). The CPU 226 then notifies the sub CPU 218 of the main unit 201 of the completion of disconnection of the FAX 207 (step S113).

The central processing unit 212, which has received the notification from the sub CPU 218, returns the switch 221 to the original position, and connects the CODEC 217 to the two-line-four-line converter 222 (step S114).

The central processing unit 212 stores conversation-fee data in the memory 213 for every conversation from the extension telephone sets 203 through 206 by detecting accounting pulses from the telephone line 202a or 202b or by referring to an accounting table stored in the memory 213.

Conversation fees are output upon instruction of the user by a switch (not illustrated) provided in the main unit 201 or by the operation unit 237 of the extension telephone set 206 provided with functions. Conversation fees may also be output by a timer (not illustrated) provided in the central processing unit 212 in the main unit 201 at a predetermined time.

In this case, if the FAX 207 is being used for the purpose of transmission and reception, the central processing unit 212 outputs conversation-fee data after the completion of FAX operation.

In the present embodiment, a description has been provided for a case in which signals on a conversation line are analog signals. On the other hand, even when voice signals on a conversation line are digital signals, conventional GII and GIII FAX's can be utilized by, for example, providing a CODEC between the MODEM 216 and the switch 221 and in the midsection of the FAX line 236.

As explained above, according to the present embodiment, it is possible to output conversation fees without using an exclusive, that is, dedicated apparatus. Hence, it is possible to simplify the configuration of a system.

Example 2

The second embodiment is an example in which data are transmitted to a terminal device 803 connected to a private branch switchboard or exchange 801 without passing via a telephone set.

Figure 6B:
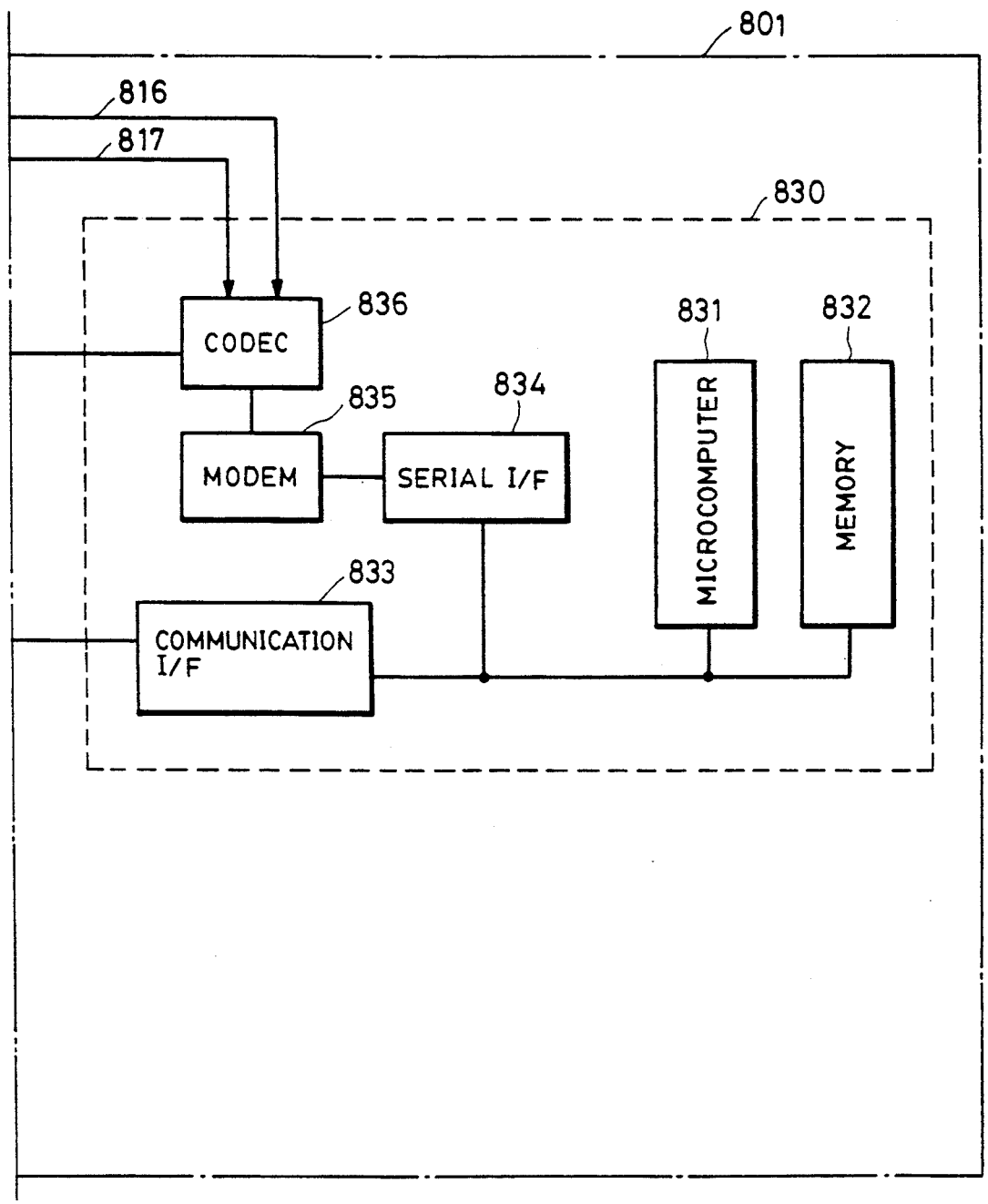
FIG. 6, composed of FIGS. 6A and 6B, is a block diagram of a second embodiment.

FIG. 6 shows the configuration of a private branch exchange system which includes a MODEM 835 for data communication within a private branch switchboard 801. In FIG. 6, there are shown a private branch switchboard 801, a telephone network 802, an extension terminal device 803, such as a facsimile and the like, including a MODEM for data communication, a CC (central control) unit 811 for controlling the entire private branch exchange system, and an MTS (memory time switch) 812 for performing PCM (pulse code modulation) highway time-sharing exchange. There are also shown a telephone line interface (I/F) 814 and an extension interface 815, each having a CODEC. There are also shown a clock circuit 813 for supplying clock signals 817 and synchronizing signals 816 for controlling PCM highways to each CODEC, a down PCM highway 819 from each CODEC to the MTS unit 812, an up PCM highway 818 from the MTS unit 812 to a CODEC 836, and a control signal 820 between each interface and a data output unit 830 and the CC unit 811. The system also includes, within the data output unit 830, a microcomputer 831 for controlling the data output unit, a memory 832 for storing transmission data, a communication interface 833 for performing communication between the microcomputer 831 and the CC unit 811, a serial communication interface 834, a MODEM 835 for converting serial data outputs of the serial communication interface 834 into analog modulating signals, and a CODEC 836 for converting the analog modulating signals of the MODEM 835 into PCM codes and sending them out to the up PCM highway 818.

When the telephone line I/F 814 detects a call-reception from the telephone network 802, the CC unit 811 rings telephones 841 and 842. When an extension I/F 851 or 852 detects that either of the telephones 841 and 842 has responded, the CC unit 811 controls the MTS unit 812 and connects the telephone network which performed call-reception to the extension telephone which has responded.

Next, an operation in which data are transmitted from the data output unit 830 to the extension terminal 803 will be explained.

First, the CC unit 811 controls the MTS unit 812 so that PCM data from the data output unit 830 are transmitted to the extension I/F 815. The microcomputer 831 then transmits data to be transmitted from the memory 832 to the MODEM 835 via the serial I/F 834. The data are then converted into analog modulating signals in the MODEM 835. The analog modulating signals are further converted into PCM codes by the CODEC 836. The converted PCM codes are sent out to the up PCM highway 818 with the timings of the clock signal 817 and the synchronizing signal 816. The PCM codes pass through the MTS unit 812 and the down PCM highway 819, and are converted into analog signals in the extension I/F 815 and received at the extension terminal 803.

That is, data read from the memory 832 are successively converted into analog modulating signals, PCM codes and analog signals.

Example 3

The third embodiment is an example in which a general-purpose microcomputer 31 (FIG. 7B) is provided in the data output unit 30, and the general-purpose microcomputer 31 produces PCM codes which are subjected to modem modulation in accordance with output data without first being converted to analog signals (keeping the form of digital signals). The PCM codes produced by the general-purpose computer 31 are subjected to serial conversion and sent out to a PCM highway.

Figures 7, 7A:
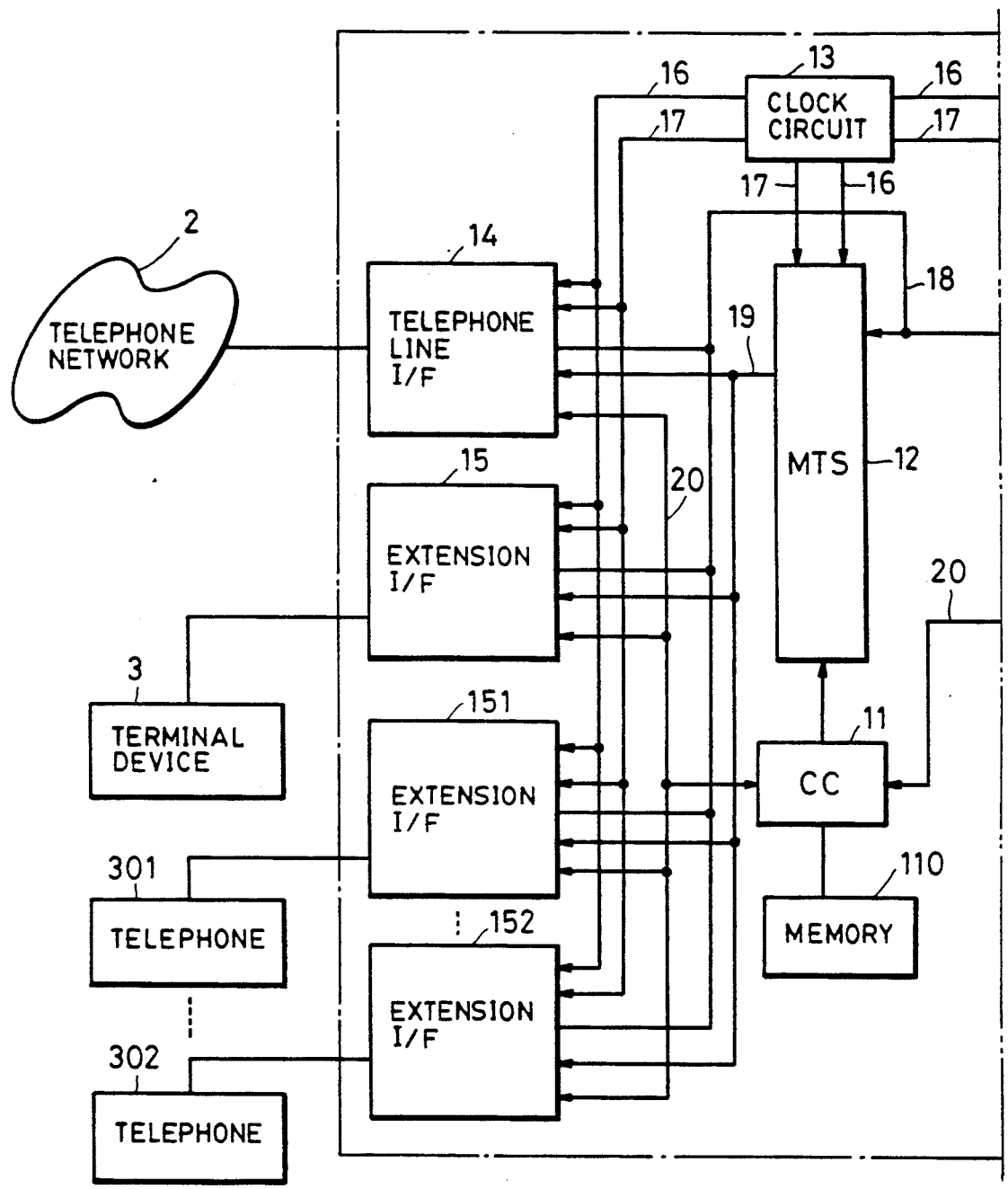
FIG. 7, composed of FIGS. 7A and 7B, is a block diagram of a third embodiment.
Figure 7B:
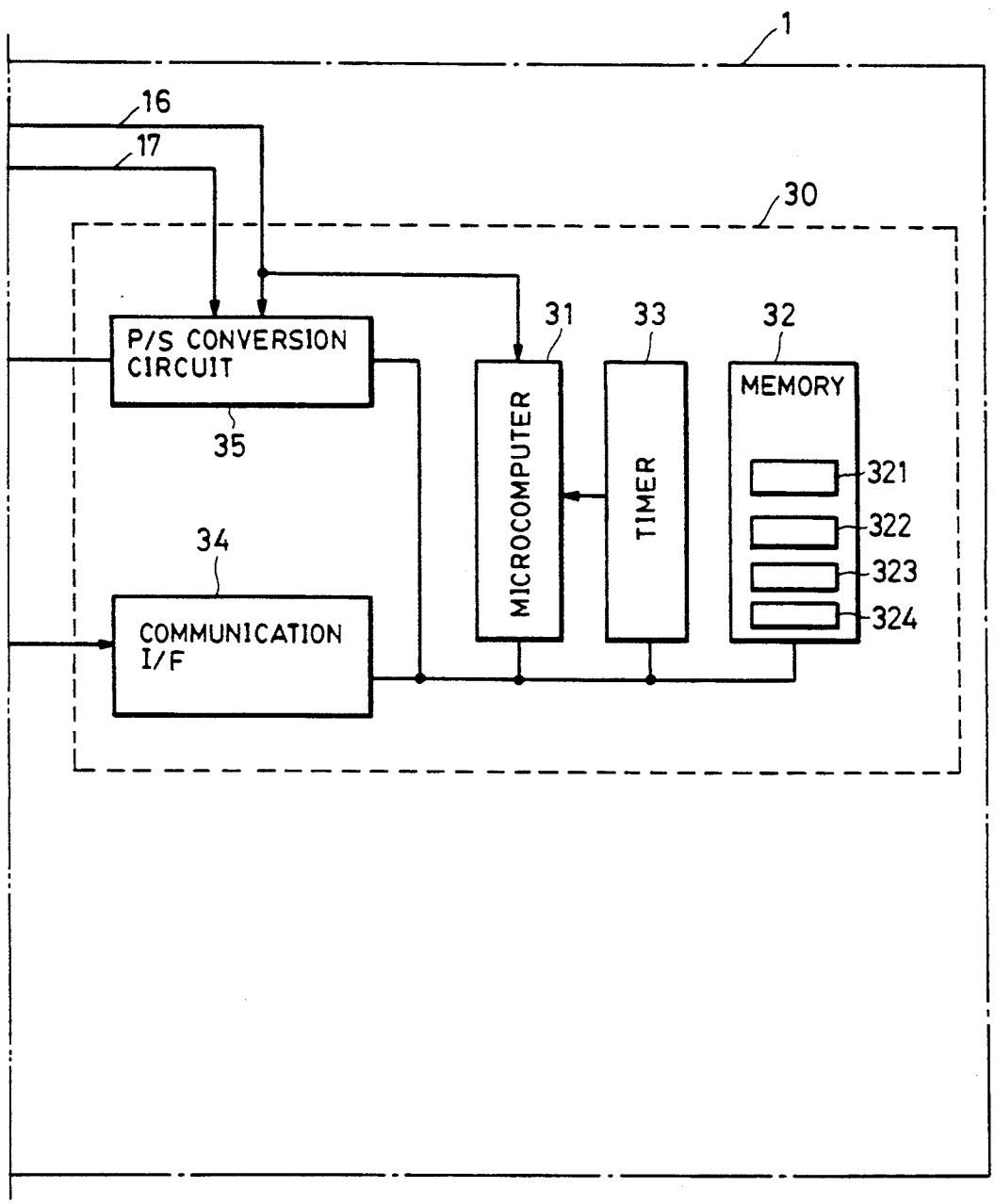

FIG. 7 (7A and 7B) is a block diagram indicating the configuration of the third embodiment of the present invention. In FIG. 7, there are shown a private branch exchange system 1 for performing the exchange of a telephone network 2, a terminal device 3 and telephones 301 and 302, the telephone network 2, the terminal device 3, such as a facsimile and the like, including a MODEM for data communication, the telephones 301 and 302, a CC unit 11 for controlling the private branch exchange system, an MTS 12 unit for performing time sharing exchange of PCM highways, a clock circuit 13 for supplying a clock signal 17 and a synchronizing signal 16 for controlling PCM highways to each unit, a telephone line interface 14 including a CODEC, a telephone line I/F circuit and the like and for, performing PCM conversion and telephone line control, and extension interfaces 15, 151 and 152 each including a CODEC, an extension I/F circuit and the like and for performing PCM conversion and extension control. There are also shown a synchronizing signal 16 for synchronizing CODEC's and the like, a clock signal 17 for controlling CODEC's and the MTS unit, an up PCM highway 18, a down PCM highway 19, and a control signal 20 between the CC unit 11 and each unit. The system further includes a data output unit 30 for sending out data to the terminal device 3, a general-purpose microcomputer 31 for controlling the data output unit 30, a memory 32, a timer 33 for sending out interruption signals to the microcomputer 31, a communication I/F 34 for performing communication between the CC unit 11 and the microcomputer 31, and a P/S (parallel/serial) convertion circuit 35 for converting parallel data into serial data and sending out the converted data to the up PCM highway in synchronization with the synchronizing signal 16.

When the telephone line I/F 14 detects a call-reception from the telephone network 2, the CC unit 11 rings the telephones 301 and 302. When the extension I/F 151 or 152 detects that either of the telephones 301 and 302 has responded, the CC unit 11 controls the MTS unit 12 and connects the telephone network which performed the call reception to the extension telephone which has responded.

Next, a case in which data are transmitted from the data output unit 30 to the terminal device 3 by a four-phase PSK (phase-shift keying) modulation (carrier wave: 1800 Hz (herz), phase-shift period: 1200 Hz) will be explained.

First, the CC unit 11 controls the MTS unit 12, and connects the PCM highways 18 and 19 between the data output unit 30 and the terminal device 3. The microcomputer 31 reads from area 321 in the memory 32 PCM codes as parallel data. The parallel data are converted into serial signals in the P/S conversion circuit 35. Data to be registered in the memory 32 will be explained in detail later. Now, the PCM codes sent out to the MTS unit 12 are exchanged in the MTS unit 12, and sent out to the extension I/F 15 via the down PCM highway 19. The extension I/F 15 further converts the received PCM codes into analog signals and sends out the converted signals to the terminal device 3.

Next, operation in the data output unit 30 will be explained.

In order to send out, for example, signals having a frequency of 1800 Hz (which correspond to carrier waves) to a PCM highway (having a sampling frequency of 8 KHz (kiloherz)) as PCM codes, values obtained by sampling the carrier waves at 8 KHz may be sent out to a PCM highway. For that purpose, since carrier-wave frequency/sampling frequency=1800/8K=9/40, PCM codes which correspond to peak values when one cycle of the carrier wave is divided into 40 equal parts may be registered in the table of area 321 in the memory 32, and every 9th values is read from the values divided into 40 equal parts.

Figures 8, 11:
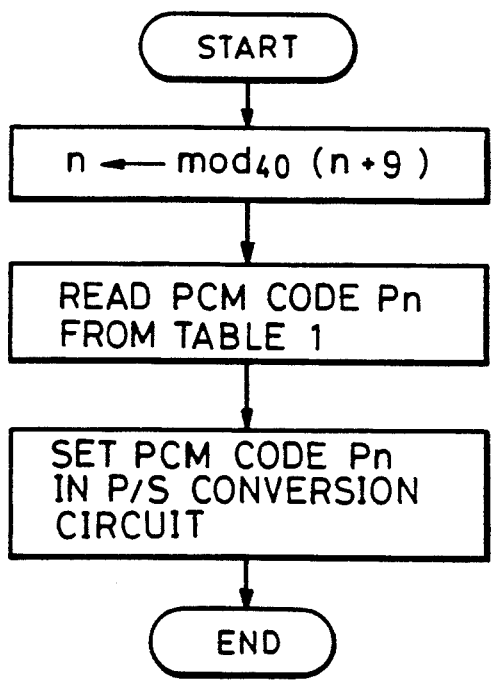
FIG. 8 is a diagram showing a correspondence between addresses in table 321 and PCM codes.

The operation will be further explained in detail. The memory 32 previously has had stored therein a table 321 as shown in FIG. 8. In the table, $P_x$ (x is an integer from 0 to 39) is a value in which an amplitude value $A_x$ of an analog sound signal is first obtained by the formula:

$$A_x = A \sin(2\pi x/40)$$

(A is an appropriate amplitude value), and then is converted into a PCM code. The microcomputer 31 reads a proper PCM code from among PCM codes P0–P39 in the table 321 in synchronization with the synchronizing signal 16. By sending out the PCM code to the up PCM highway 18 via the P/S conversion circuit 35, it is possible to send out signals corresponding to 1800 Hz carrier waves.

Figure 9:
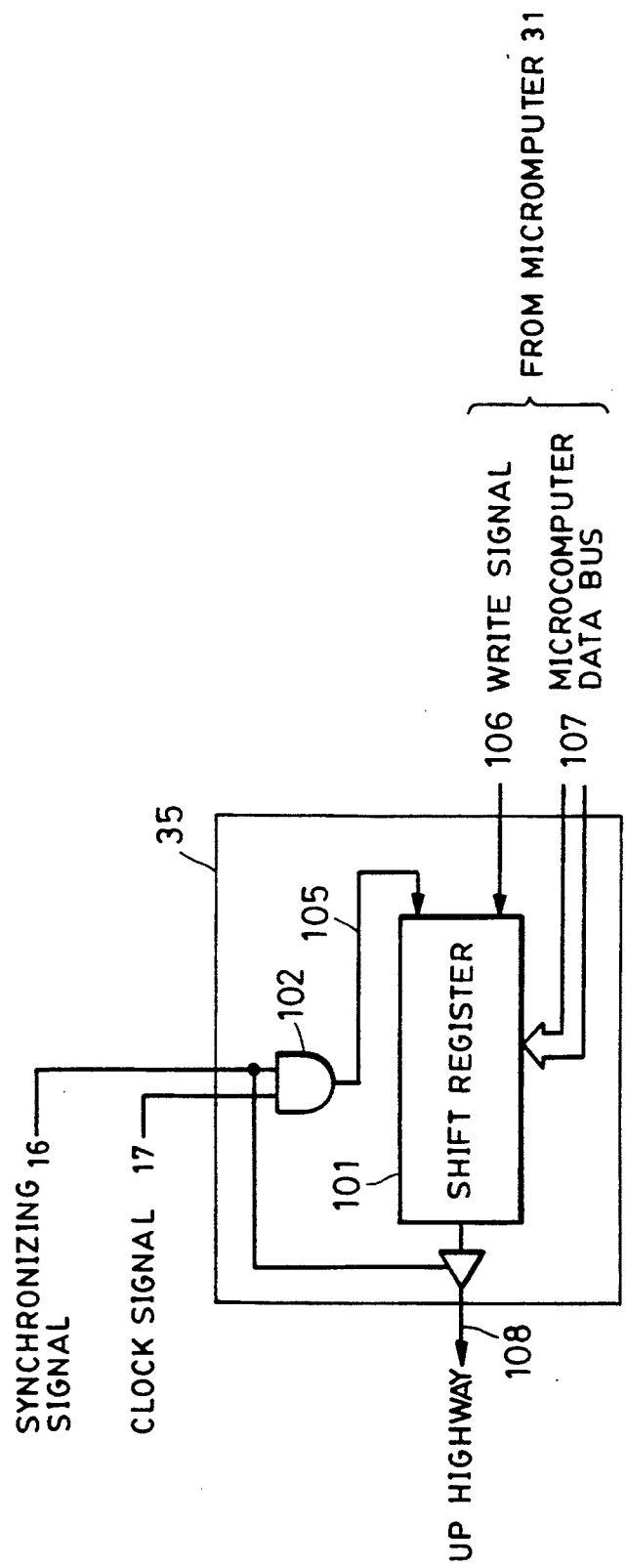
FIG. 9 is a circuit diagram of a P/S conversion circuit 35.

The P/S conversion circuit has the configuration as shown in FIG. 9. In FIG. 9, there are shown an 8-bit shift register 101, an AND gate 102, the synchronizing signal 16, the clock signal 17, a shift clock 105 of the shift register 101, a write signal 106 from the microcomputer 31 for setting data in the shift register 101, a data bus 107 of the microcomputer 31, and an output 108 of the shift register 101 which is connected to the up PCM highway 18.

Timing charts of the P/S conversion circuit 35 are as shown in FIG. 10. Every time the 8-KHz synchronizing signal 16 is input, the shift register 101 serializes PCM codes which had previously been written therein via the microcomputer data bus 107 and sends them out (bit by bit). The wave form 108 of the output is as shown in the timing chart of FIG. 10.

The microcomputer 31 generates an interruption by the synchronizing signal 16. When the interruption has been generated (that is, the sending-out of a PCM code has been completed), the microcomputer 31 outputs a write signal 106 to the shift register 101, and writes therein a next PCM code to be subsequently sent out.

The interruption processing will be now explained. First, a case in which carrier waves are sent out without performing phase modulation will be explained in accordance with the flow chart in FIG. 11. In FIG. 11, n indicates an address in the table 321 corresponding to the PCM code which has been sent out just previously. First, the microcomputer 31 adds 9 to n, obtains a modulo 40 of the added value and resets the value of the modulo as n. The microcomputer 31 then reads the PCM code $P_n$ from the table 321 in the memory 32 and writes it in the shift register 101 in the P/S conversion circuit 35. Values of PCM codes in the table 321 are obtained by sampling one period of a carrier wave 40 times with an equal interval. That is, the values whose addresses differ by one are equivalent to those generated when a 1800-Hz carrier wave is sampled every 72 KHz and is converted into PCM codes. Hence, the PCM codes being sent out while adding 9 to the addresses every time (modulos being obtained) become equivalent to a 1800-Hz carrier wave sampled at 8 KHz (the sampling frequency of the PCM highway is 8 KHz). By thus continuing to send out PCM codes, it is possible to send out PCM data along the 1800-Hz carrier wave to a PCM highway, as shown in FIG. 12.

That is, the shift register 101 outputs data bit by bit to the up highway 18 for every input of the clock signal 17 while the synchronizing signal 16 (having a period of 125 μsec) is kept turned on. When the synchronizing signal 16 is turned off, the microcomputer 31 reads 8-bit parallel data from the area 321 in the memory 32, and sets the data in the shift register 101. The microcomputer 31 further has the shift register 101 output data bit by bit for every input of the clock signal 17 to the up highway 18 while the synchronizing signal 16 is kept turned on. This operation is repeated.

When the phase is changed for performing a PSK modulation, the value of the timer 33 is set so that an interruption occurs in the microcomputer 31 with a period for changing its phase, in the present embodiment with a phase shift period of 1200 Hz (833.3 μsec). A phase modulation is performed by changing the value of n by the microcomputer 31 when an interruption has occurred by the interruption signal. That is, the microcomputer 31 does not change the value of n to n+9, as in the case of no phase change. Since 360° is divided into 40 equal parts in this case, n is made $\mathrm{mod}_{40}(n+19)$, $\mathrm{mod}_{40}(n+29)$ and $\mathrm{mod}_{40}(n+39)$ in the case of +90°, +180° and +270° phase change, respectively. These values are indicated by data "00", "01", "11" and "10" when the phase change is 0°, +90°, +180° and +270°, respectively. By thus changing the value of n, the microcomputer 31 writes a PCM code subjected to a phase modulation into the P/S conversion circuit 35 with the timing of sending out the succeeding PCM code. The timing at this time is shown in FIG. 13 illustrating a case of +90° phase modulation. The shift amount of phase modulation can be achieved with previously investigating transmission data by the microcomputer 31.

An explanation of the operation will be further provided in detail. The CC unit 11 sums up conversation-fee data into the memory 110 for every call from an extension telephone. On the other hand, the memory 32 stores fonts in area 323. The microcomputer 31 performs a font expansion of data sent from the CC unit 11 and stores the results in area 322 as a bit map. Every time an interruption occurs by the timer 33, the microcomputer 31 checks the bit map memory area 322 of the memory 32 for two bits.

It is now assumed that
n = $\mathrm{mod}_{40}$ (n+9) if the data are "00",
n = $\mathrm{mod}_{40}$ (n+19) if the data are "01",
n = $\mathrm{mod}_{40}$ (n+29) if the data are "11",
n = $\mathrm{mod}_{40}$ (n+39) if the data are "10".

For example, when transmitted data are "00011100" (that is, in the case of three white dots, three black dots and two white dots), n becomes 0, 9, 18, 27, 36, 5 and 14 for the first two data bits "00".

An interruption by the timer 33 then occurs for the microcomputer 31, and since the phase is +90° for the second two data bits "01", n becomes 33, 2, 11, 20, 29 and 38. An interruption by the timer 33 then occurs, and since the phase is +180° for the data "11", n becomes 27, 36, 5, 14, 23, 32 and 1. An interruption by the timer 33 then occurs, and since the phase is +0° for the data "00", n becomes 10, 19, 28, 37, 6, 15 and 24.

When the microcomputer 31 compresses image signals by MH (modified Huffman) and MR (modified Read) to prepare transmission data, the signals may be compressed after having been subjected to a font expansion and then the resultant data may be stored in area 322. By reading PCM codes from area 321 in the memory 32 according to the compressed transmitted data, it is possible to send out compressed image signals.

When the terminal device 3 is a fascimile, it is also possible to send out fascimile control signals such as preceding procedure signals by referring to control signal area 324 in the memory 3. However, when the terminal device 3 is a fascimile, the private branch exchange apparatus must demodulate procedure signals from the terminal device 3. A procedure signal is a low-speed frequency modulation signal. Accordingly, the data output unit 30 may perform transmission and reception of procedure signals with the terminal device 3 by a low-speed MODEM for frequency modulation (not illustrated), and may perform high-speed image data output using the table 321.

It becomes thus possible to send out modem-modulated PCM codes, and data can be transmitted from the data transmission unit 30 to the terminal device 3.

Thus, according to the present embodiment, since it is possible to perform data transmission without using a MODEM, the present embodiment has the effect of reducing cost. Moreover, since modulated PCM codes are prepared without first being converted to analog signals, it is possible to prevent deterioration of transmission quality.

When the terminal device 3 receives image data from the telephone network 2, the telephone line I/F 14 converts image data received from the telephone network 2 into PCM codes. The image data converted into PCM codes are then transferred from the extension I/F 14 to the extension I/F 15 with a timing controlled by the CC unit 11. The extension I/F 15 converts transferred PCM codes into analog signals and outputs them to the terminal device 3. The terminal device 3 then records images according to the received signals.

In the above-described embodiment, an example has been given in which data are transmitted to a terminal device connected to a private branch exchange system. In this case, the terminal device may by a terminal device connected via a telephone network and the like.

Furthermore, the modulation is not limited to PSK modulation, but any other modulation methods, such as FSK (frequency shift keying) modulation and the like, may also be used. In the case of FSK modulation, an interval between addresses to be read may be controlled in accordance with transmission data.

That is, in the present embodiment, in order to generate a 1800-Hz sine wave, the microcomputer 31 reads every nineth data from the table 321 for every 8-KHz synchronizing signal 16. On the other hand, if the microcomputer 31 reads every eighth data from the table 321, it is possible to generate a sine wave of 8 KHz×8/40=1600 (Hz).

Accordingly, using the table 321, it is possible to generate a sine wave of an integer multiple (up to 8 KHz at maximum) of 8 KHz/40=200 Hz.

Although, in the above-described embodiment, PCM codes are sent out from the P/S conversion circuit 35 to the extension I/F 15 via the MTS unit 12, PCM codes may also be sent outside of the MTS unit 12. That is, data may be output directly from the P/S conversion circuit 35 to the extension I/F 15.

In the above-described embodiment, signals are sent out as PCM data, and subjected to analog conversion in the extension I/F 15. That is, digital exchange by time sharing is performed. On the other hand, in the case of an analog switchboard, outputs from the P/S conversion circuit 35 may be subjected to analog conversion, and then passed to the analog switchboard.

In the present embodiment, plural digital data in accordance with the waveform of a carrier wave have previously been stored in the memory 32. By sequentially reading digital data from the memory 32, the microcomputer 31 then performs sampling of the carrier wave and outputs digital data equivalent to values subjected to digital conversion. By controlling an interval of reading data from the memory 32 in accordance with information to be transmitted, the microcomputer 31 then performs sampling of the modulated carrier wave and outputs digital data equivalent to values subjected to digital conversion. Hence, according to the present embodiment, it is possible to transmit image information without modulating analog signals, that is, without using an expensive circuit.

Furthermore, in the present embodiment, since PCM codes have previously been stored in the table 321, it is not necessary to provide a coder in the data output unit 30. Hence, it is possible to simplify the configuration of the data output unit 30.

It is to be noted that the present invention is not limited to the above-described embodiments, but various modifications and applications are also possible within the scope of the following claims.

What is claimed is:

1. A communication apparatus, comprising:
   input means for inputting information to be transmitted;
   storage means for storing plural data;
   read means for reading out plural data sequentially from storage locations in said storage means according to a first rule so that plural data which represent an analog wave are read out, said read means changing a storage location to be read out in accordance with the information inputted by said input means and a second rule which is different from said first rule so that plural data which represent the analog wave as modulated at a predetermined timing are read out; and
   transmitting means for transmitting the information to a digital network, wherein said read means reads out the plural data in synchronism with synchronizing signals of the digital network.

2. A communication apparatus according to claim 1, wherein said storage means stores plural PCM modes in accordance with the waveform of a carrier wave.

3. A communication apparatus according to claim 1, wherein said storage means stores plural digital data in accordance with a waveform of a carrier wave.

4. A communication apparatus according to claim 1, wherein said plural data are digital data and said read means reads out the digital data which corresponds to information to be transmitted from said storage means.

5. A communication apparatus according to claim 1, wherein said storage means has a plurality of storage locations where data should be stored and said read means changes an interval of storage locations from which data should be read out, according to information to be transmitted.

6. A communication apparatus according to claim 1, wherein said read means reproduces the analog wave by reading out a plurality of data sequentially from a plurality of storage locations at a pre-determined address interval, determines an address to be read out next after it reads out a plurality of data, in accordance with the information to be transmitted and reproduces a modulated analog wave by reading out a plurality of data sequentially from a determined address at the pre-determined address interval.

7. A communication apparatus according to claim 1, wherein said read means reads out plural data sequentially from the storage locations at first predetermined address intervals at predetermined times according to the first rule, and said read means reads out plural data from the storage locations at second predetermined address intervals in accordance with the information to be transmitted according to the second rule.

8. A communication apparatus according to claim 1, wherein the information to be transmitted includes conversation fee information.

9. A telephone exchange apparatus, comprising:
    table memory means for storing an accounting table for determining conversation fees;
    writable memory means for storing data written therein;
    writing means for writing conversation fee data in said writable memory means by referring the accounting table every time when a conversation is performed;
    connection means for connecting an extension facsimile device; and
    transmission means for converting conversation fee data written in said writable memory means into a facsimile signal and transmitting the facsimile signal to the connected extension facsimile device.

10. A telephone exchange apparatus according to claim 9, wherein said telephone exchange apparatus further comprises:
    generation means for generating a call signal for the facsimile device;
    said transmission means transmitting said converted stored information to the facsimile device when it detects a response from the facsimile device to said call signal.

11. An exchange apparatus comprising:
    connection means for connecting an image recording apparatus;
    storage means for storing digital data which correspond to an analog waveform;
    read means for reading out the digital data from a storage location which corresponds to an image signal to be transmitted;
    conversion means for converting the digital data read by said read means into analog signals and sending the analog signals to said image recording apparatus; and
    transmitting means for transmitting the image signal.

12. An exchange apparatus according to claim 11, wherein said connection means comprises:
    a network; and
    connection control means for controlling said network so that said conversion means is connected to said image recording apparatus.

13. An exchange apparatus according to claim 12, wherein said network is a time-sharing network, and said conversion means receives the digital data generated by said generation means via said time-sharing network.

14. An exchange apparatus according to claim 11, wherein said storage means stores plural PCM codes in accordance with a waveform of a carrier wave.

15. An exchange apparatus according to claim 11, wherein said read means reads the digital data at a predetermined interval.

16. An exchange apparatus according to claim 11, wherein said read means reproduces the analog waveform by reading out a plurality of data sequentially from a plurality of storage locations at a pre-determined address interval, determines an address to be read out next after it reads out a plurality of data, in accordance with the image signal to be transmitted and reproduces a modulated analog wave by reading out a plurality of data sequentially from a determined address at the predetermined address interval.

17. An exchange apparatus according to claim 11, wherein said read means reads out a predetermined number of plural digital data sequentially from storage locations at predetermined address intervals, and said read means reads out digital data from storage locations according to the image signal to be transmitted every time that the predetermined number of plural data are read out.

18. A telephone exchange apparatus comprising:
    storage means for storing digital data which correspond to an analog waveform;
    read means for reading out the digital data from a storage location which corresponds to an image signal to be transmitted;
    network means for connecting an image recording apparatus and plural telephone sets; and
    transmission means for transmitting the digital data read out by said read means to said connected image recording apparatus.

19. A telephone exchange apparatus according to claim 18, wherein said read means reads out stored digital data in a sequence which corresponds to the image signal to be transmitted.

20. A telephone exchange apparatus according to claim 18, wherein said storage means has a plurality of storage locations where data should be stored and said read means changes an interval of storage locations from which digital data should be read out, in accordance with the image signal to be transmitted.

21. A telephone exchange apparatus according to claim 18, wherein said network means connects said read means and said transmission means.

22. A telephone exchange apparatus according to claim 18, wherein said transmission means converts the digital data read out by said read means into an analog signal and transmits it to said image recording apparatus.

23. A telephone exchange apparatus according to claim 18, wherein said read means reads out the digital data from the storage location which corresponds to conversation fee information that is to be recorded by said image recording apparatus.

24. A telephone exchange apparatus according to claim 18, wherein said read means reproduces the analog waveform by reading out a plurality of data sequentially from a plurality of storage locations at a pre-determined address interval, determines an address to be read out next after it reads out a plurality of data, in accordance with the image signal to be transmitted and reproduces modulated analog wave by reading out a plurality of data sequentially from a determined address at above pre-determined address interval.

25. A telephone exchange apparatus according to claim 18, wherein said read means reads out a predetermined number of plural digital data sequentially from storage locations at predetermined address intervals, and said read means reads out digital data from storage locations according to the image signal to be transmitted every time that the predetermined number of plural data are read out.

26. A telephone exchange apparatus comprising:
    input means for inputting information to be transmitted;
    storage means for storing plural data;

read means for reading out plural data sequentially from said storage means according to a first rule so that plural data which represent an analog wave are read out, said read means determining a storage location to be read out in accordance with the information inputted by said input means and a second rule which is different from said first rule so that plural data which represent the analog wave as modulated at a predetermined timing are read out;

transmitting means for transmitting the information;

network means for connecting a terminal device and plural telephone sets; and control means for controlling said network means so that the plural data read out by said read means are received by said terminal device.

27. A telephone exchange apparatus according to claim 26, wherein said read means reads out stored digital data in a sequence which corresponds to information to be transmitted.

28. A telephone exchange apparatus according to claim 26, wherein said storage means has a plurality of storage locations where data should be stored and said read means changes an interval of storage locations where data should be read out, in accordance with the information to be transmitted.

29. A telephone exchange apparatus according to claim 26, wherein said network means comprises a memory time switch.

30. A telephone exchange apparatus according to claim 26 wherein said storage means stores PCM codes.

31. A telephone exchange apparatus according to claim 30, wherein said read means is connected with said network means through a PCM highway and said read means forwards PCM codes read out from said storage means to said PCM highway.

32. A telephone exchange apparatus according to claim 26, wherein said read means reads out the plural data from a storage location which corresponds to conversation fee information which is to be recorded by an image recording apparatus.

33. A telephone exchange apparatus according to claim 26, wherein said read means reproduces the analog waveform by reading out a plurality of data sequentially from a plurality of storage locations at a pre-determined address interval, determines an address to be read out next after it reads out a plurality of data, in accordance with the information to be transmitted and reproduces a modulated analog wave by reading out a plurality of data sequentially from a determined address at the pre-determined address interval.

34. A telephone exchange apparatus according to claim 26, wherein said read means reads out a predetermined number of plural data sequentially from storage locations at predetermined address intervals, and said read means reads out digital data from storage locations according to the information to be transmitted.

35. A method for managing a conversation fee in a telephone exchange apparatus, comprising the steps of:

(1) determining conversation fee information by referring to an accounting table every time when a conversation is performed;

(2) storing the conversation fee information determined at the determining step into a memory;

(3) calling an extension facsimile device in accordance with a requirement for recording of the conversation fee;

(4) reading out the conversation fee information stored in the memory when a response of the extension facsimile device is detected; and (5) converting the read out conversation fee information into a facsimile signal and transmitting the facsimile signal to the extension facsimile device.

36. A method for generating digital data which represent an analog wave modulated according to information to be transmitted to a digital network, comprising the steps of:

(1) reading out plural digital data sequentially from a memory in accordance with a first rule in synchronism with synchronizing signals of the digital network, the memory storing plural digital data in accordance with the analog waveform;

(2) inputting the information to be transmitted;

(3) determining the address of the memory from which digital data are read out according to the information inputted at the inputting step and according to a second rule which is different from said first rule; and (4) reading out the plural data sequentially from the determined address according to the first rule.

37. A method according to claim 36, wherein said step (1) comprises a step of reading out plural digital data sequentially at a predetermined address interval from the memory to reproduce an analog wave.

38. A method according to claim 36, wherein said step (4) comprises a step of reading out plural digital data sequentially at a pre-determined address interval from the determined address to reproduce a modulated analog wave.

39. A method according to claim 36, wherein said step (3) determines the address of the memory from which the digital data and read out after predetermined number of the plural data are read out at said step (1).

40. A transmission apparatus for transmitting information via a digital network, comprising:

storage means for storing digital data which corresponds to an analog waveform;

read means for reading out the digital data from a storage location which corresponds to the information in synchronism with synchronizing signals of the digital network; and transmission means for transmitting the digital data read out by said read means to the digital network wherein said read means reproduces the analog waveform by reading out a plurality of data sequentially from a plurality of storage locations at a predetermined address interval, determines an address to be read out next after it reads out a plurality of data in accordance with the information and reproduces modulated analog wave by reading out a plurality of data sequentially from a determined address at above predetermined address interval.

41. A transmission apparatus according to claim 40, wherein said read means reads out stored digital data in a sequence which corresponds to image information.

42. A transmission apparatus according to claim 40, wherein said storage means has a plurality of storage locations where data should be stored and said read means changes an interval of storage locations from which digital data should be read out in accordance with the information.

43. A transmission apparatus according to claim 40, wherein the digital network means connects a reception party and said transmission means.

44. A transmission apparatus according to claim 40, wherein said read means reads out the digital data from the storage location which corresponds to conversation fee information.

45. A transmission apparatus according to claim 40, wherein said read means reads out a predetermined number of plural digital data sequentially from storage locations at predetermined address intervals, and said read means reads out digital data from storage locations according to the information every time that the predetermined number of plural data are read out.

46. A method for transmitting digital data which represents an analog wave modulated according to information to be transmitted to a digital network, comprising the steps of:
(1) reading out plural digital data sequentially from a memory in accordance with a first rule, the memory storing plural digital data in accordance with the analog waveform;
(2) transmitting the plural digital data read out at said step (1) to the digital network in synchronism with synchronizing signals of the digital network;
(3) inputting the information to be transmitted;
(4) determining the address of the memory from which digital data is read out according to the information inputted at the step (3) and according to a second rule which is different from said first rule;
(5) reading out the plural data sequentially from the determined address according to the first rule; and
(6) transmitting the plural digital data read out at said step (5) to the digital network.

47. A method according to claim 46, wherein said step (1) comprises a step of reading out plural digital data sequentially at a predetermined address interval from the above memory to reproduce an analog wave.

48. A method according to claim 46, wherein said step (4) comprises a step of reading out plural digital data sequentially at a predetermined address interval from the determined address to reproduce a modulated analog wave.

49. A method according to claim 46, wherein said step (4) determines the address of the memory from which digital data is read out after a predetermined number of the plural data are read out at said step (1).

* * * * *

UNITED STATES PATENT AND TRADEMARK OFFICE
CERTIFICATE OF CORRECTION

PATENT NO. : 5,311,580
DATED : May 10, 1994
INVENTOR(S) : KUNIAKI OTSUKA, ET AL.

It is certified that error appears in the above-identified patent and that said Letters Patent is hereby corrected as shown below:

<u>IN THE DRAWINGS</u>

Sheet 10 of 13, "MICROMPUTER" should read --MICROCOMPUTER--.

<u>COLUMN 6</u>

Line 6, "for," should read --for--.

<u>COLUMN 9</u>

Line 31, "by" should read --be--.

<u>COLUMN 10</u>

Line 40, "modes" should read --codes--.

<u>COLUMN 13</u>

Line 31, "claim 26" should read --claim 26,--.

Signed and Sealed this

First Day of November, 1994

Attest:

BRUCE LEHMAN

*Attesting Officer*    *Commissioner of Patents and Trademarks*